Patented Aug. 23, 1932

1,873,631

UNITED STATES PATENT OFFICE

ARNOLD PFISTER, OF CLIFTON, NEW JERSEY

MANUFACTURE OF VEGETABLE GUM SOLUTIONS

No Drawing.  Application filed September 22, 1930.  Serial No. 483,755.

Vegetable gums used in certain textile processing operations (for instance, as a thickening agent in textile printing), food products, pharmaceutical preparations, etc., may be divided into two classes, to wit, those, such as Acacia, which are soluble in cold water, and those, such as Tragacanth, Karaya and Shiras, which are insoluble in and merely swell on application of cold water to form a viscous mass or jell and require an additional treatment to form solutions thereof, as by application of heat, or heat and hydrogen peroxide, etc.

Solutions of vegetable gums are in many instances not accepted as usable for the above indicated purposes unless they are devoid or substantially devoid of not only woody and other insoluble or foreign matter but of color.

Usable solutions of gums of the first class are possible of being readily produced because any woody or other insoluble or foreign matter is readily removable from the solution by ordinary filtering or straining, and since the gums are easily dissolved in cold water, and when so dissolved extraction of color does not occur, the resulting solution is usually quite free of color.

On the other hand, the production of usable solutions of gums of the second class has heretofore been regarded as impossible without a more extended treatment than that applied in the case of gums of the first class and certain other disadvantages. That is to say, after the particular gum had been converted to a jell and then by application of heat made soluble and converted to solution form in the presence of the solvent thereof, as water, there was no particular difficulty in removing, by filtering or straining, the woody and other insoluble or foreign matter present in the solution; but the thus-treated solution nevertheless was colored as an incident of the treatment of the jell to render it soluble, and this could only be removed by subjecting the solution to a chemical bleaching action which, while it accomplished that purpose, resulted in a marked loss in the viscosity of the solution and there was also the hazard of some excess of the bleaching agent remaining in the solution, which in many cases of the use of the solution would be objectionable if not distinctly harmful.

I have discovered that I can produce usable solutions from this second class of gums, that is, solutions that are not only devoid of practically all water insoluble and other foreign matter but are also as free from color as (if not more so than) those produced from gums of the first class, and that this can be done in such a way that it is much more economical to use these gums than gums of the first class and no treatment of the solutions to remove color, as by bleaching, is necessary because the solutions when formed are already colorless. Thus:

After the particular gum has been treated with water (which should be cold to avoid extraction of color) to convert it to jell form I then filter the jell, and thereafter proceed with one of the indicated usual treatments (involving application of heat) to dissolve the jell. By filtering at the jell stage, rather than at the solution stage as heretofore, I find that I not only remove insoluble and other foreign matter as completely as least as it is removed in the old practice after converting gums of the second class to solution form, but the product-solution is invariably as free from color as (and usually more so than) that produced from gums of the first class. I account for this absence of color by the fact that my treatment avoids any step which permits prolonged contact between color-carrying woody particles or the like foreign matter and the gum in the presence of its solvent (as water) and heat.

By way of example, I usually proceed as follows:

The gum, whether refined or not, and preferably, though not necessarily, reduced to a fineness of 10–25 mesh, is first soaked in cold water until fully swollen. The resulting jell is next forced by pressure through a filter which removes all foreign (that is to say, color-carrying) matter. Then the thus-filtered jell is dissolved by one of the treatments indicated in the first part of this specification as necessary in converting this second class of gums to the soluble form and involving application of water and at least heat.

It will be understood by those skilled in this art that the condition herein referred to as absence of color does not necessarily mean transparency of the solution in bulk but that condition which characterizes gum solutions of the first class in bulk and thus makes them preferred to gum solutions of the second class when produced by the usual method and even if they have been subjected to some special color-removing step, as bleaching.

I claim:

The herein described method of converting a gum of the second class herein specified to a solution substantially devoid of foreign matter and color which consists in treating the gum with water at a temperature below that at which the gum would thereupon dissolve, thereby converting it to a jell, then filtering the jell to remove foreign matter therefrom, and then dissolving the gum by the application of water and heat.

In testimony whereof I affix my signature.

ARNOLD PFISTER.